United States Patent [19]

Nagy

[11] Patent Number: 4,872,411
[45] Date of Patent: Oct. 10, 1989

[54] APPLICATOR DEVICE

[76] Inventor: Ernest J. Nagy, 1508-41st Street, SE, Calgary, Alberta, Canada, T2A 1K8

[21] Appl. No.: 262,491

[22] Filed: Oct. 25, 1988

[30] Foreign Application Priority Data

Mar. 23, 1988 [CA] Canada ................................ 562275

[51] Int. Cl.$^4$ ........................ A01C 23/02; F16K 11/02
[52] U.S. Cl. ............................. 111/7.1; 111/7.3; 239/271; 137/625.4
[58] Field of Search ................................ 111/7.1–7.4, 111/6, 7, 82, 92, 95–98, 89; 239/271; 137/625.4, 625.1

[56] References Cited

U.S. PATENT DOCUMENTS

| | | | |
|---|---|---|---|
| 1,890,301 | 12/1932 | Oakes | 111/7.4 |
| 2,323,773 | 7/1943 | Irish | 111/7.1 |
| 2,790,403 | 4/1957 | Larsen | 111/7.1 |
| 2,885,121 | 5/1959 | Littleton | 111/7.3 |
| 3,303,800 | 2/1967 | Young | 111/7.1 |

FOREIGN PATENT DOCUMENTS

| | | | |
|---|---|---|---|
| 272906 | 7/1964 | Australia | 111/7.3 |
| 108222 | 7/1877 | France | 111/7.2 |

*Primary Examiner*—Danton D. DeMille
*Attorney, Agent, or Firm*—Kane, Dalsimer, Sullivan, Kurucz, Levy, Eisele and Richard

[57] ABSTRACT

An applicator device for injecting additives such as fertilizers, herbicides and the like into soil. The device comprises a housing from which extends an elongated injector bar moveable to selectively supply from the housing additive or water. The bottom end of the injector bar is provided with a point for easy insertion into the soil, in which point is an aperture through which additive or water from the housing flows into the soil.

8 Claims, 1 Drawing Sheet

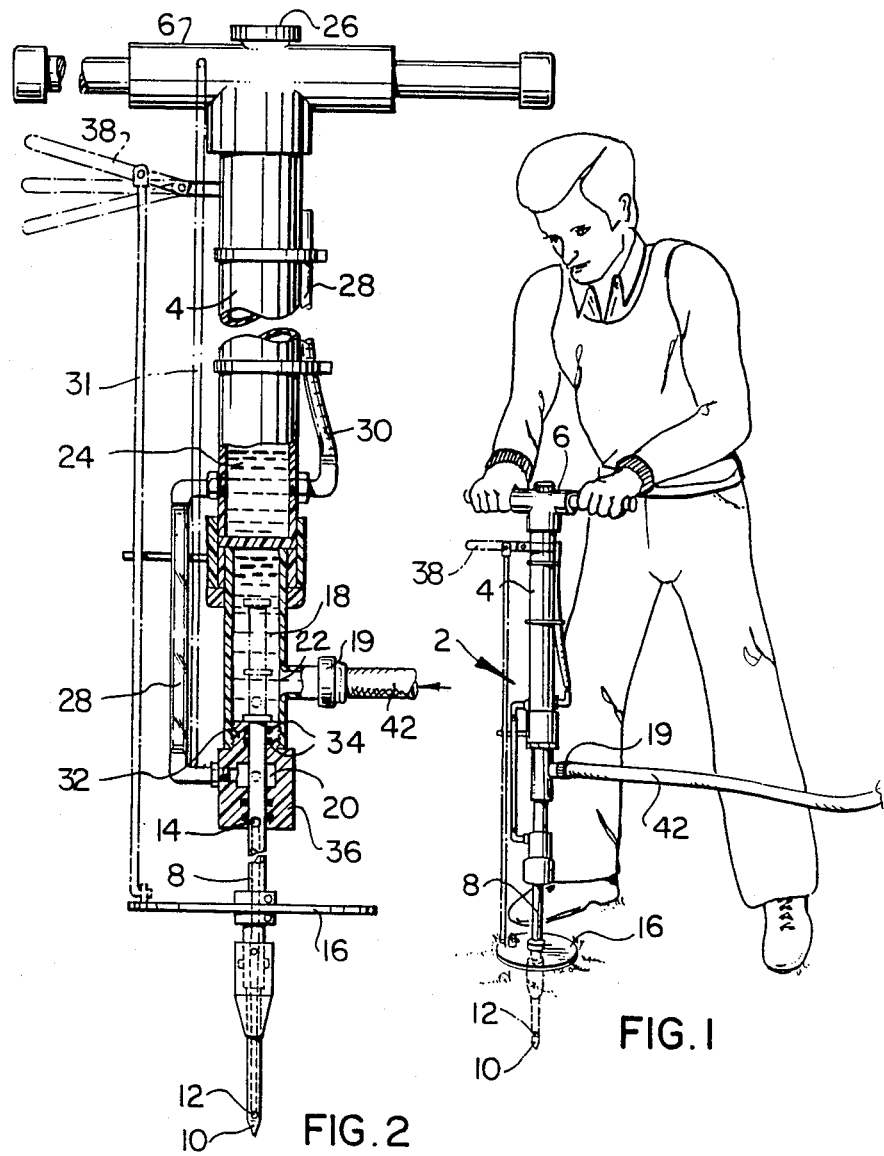

APPLICATOR DEVICE

BACKGROUND OF THE INVENTION

The present invention relates to an applicator device for injecting additives into the soil, and more particularly relates to a manually operable device for safely adding chemicals such as fertilizer, weed killers, insecticides and the like into the soil.

Devices for applying additives directly into the soil are known. For example, U.S. Pat. No. 1,979,541 of Gunn issued Nov. 6, 1934 describes and illustrates a fertilizer spreader, in which fertilizer, from a cart-mounted tank, flows by gravity feed into a valve and through holes in a distributor plate positioned on the surface of the ground. U.S. Pat. No. 2,505,174 of Daniels issued Apr. 25, 1950 describes and illustrates a root feeding device having a pointed, hollow rod with outlets at the point, fed by a valve at the top of the rod. Fertilizer capsules are placed in the valve. When the device is connected to a hose, with the point of the rod injected into the soil to the roots of a plant, water passes through the valve, draws fertilizer from the capsules and carries the fertilizer to the roots. U.S. Pat. No. 2,893,334 of Synder issued July 7, 1959 teaches a somewhat similar construction of root feeder nozzle but, instead of a fertilizer capsule, has the additive in the a container located along the hose line. That additive is drawn from the container by the flow of water and passed through the hollow, pointed rod into the soil. Young U.S. Pat. No. 3,303,800 issued Feb. 14, 1967 describes and illustrated a device somewhat similar to that of Synder, but instead of the additive being in a container in the hose line, it is in a separate container and fed by a tube to the control valve at the top of a hollow, pointed rod. Nimrick U.S. Pat. No. 3,405,669 issued Oct. 15, 1968 describes and illustrates a hollow rod, with a pointed end for injecting into the soil, about which rod is mounted a reservoir for holding fertilizer. This reservoir is provided with an aperture to feed fertilizer directly to the hollow rod. An appropriate water control valve controlling water fed to the rod by a hose is mounted at the top of the rod .

All of these devices, while no doubt suitable for the applications for which they were intended, make accurate measurement of the amount of additive placed into the soil very difficult. As well, many of them are difficult to use, and are made of multiple components and consequently are relatively complicated constructions.

It is an object of the present invention to provide an applicator device for injecting additives into the soil which permits relatively accurate measurement of the amount of additive fed to the soil. It is a further object of the present invention to provide such a device which is made of fewer components and which is relatively easy to operate.

SUMMARY OF THE INVENTION

In accordance with the present invention an applicator device is provided for injecting liquid additives into the soil. The applicator device comprises an elongated housing. The housing has a handle means associated with one end thereof. An elongated injector bar is also provided, one end of which is slidably secured within the other end of the housing to permit the bar to move longitudinally with respect to the housing between open and closed positions and an additive feed position. The other end of the bar is shaped to permit depression thereof into the soil. The bar is provided with an exit aperture at its shaped end and an entrance aperture through its body, between its ends. A channel extends within the bar between the two apertures. A carrier liquid chamber is provided in the housing with a carrier liquid supply means communicating therewith, which enables liquid to be passed to that chamber and to the channel of the bar. An additive chamber is provided in the housing beside the carrier liquid chamber in the longitudinal direction. An additive supply means communicates with the additive chamber. The entrance aperture in the injector bar is positioned, and the injector bar longitudinally moveable with respect to the housing, such that when the injector bar is in closed position, the entrance aperture is sealed off from both the carrier liquid chamber and the additive chamber so that no carrier fluid or additive can flow through the channel. When the injector bar is in open position the entrance aperture communicates with the carrier liquid chamber enabling liquid in that chamber to communicate with the channel. When the injector bar is in additive supply position, the entrance aperture communicates with the additive supply chamber enabling additive in that chamber to flow to the channel.

In a preferred embodiment a visible gauge means is associated with the additive chamber to enable the operator to determine the amount of additive in the additive chamber and the amount of additive which has passed through the exit aperture in the injector bar during operation of the device.

The applicator device according to the present invention is useful for injecting, for example, a combination of water and additives, fertilizers, weed killers or pest killers directly into the soil, with accurate measurement of the amounts injected. Because of its construction, there is minimal pollution of the air. The device is constructed as a single unit, and is extremely easy for an operator to use, requiring only three steps: (1) the filling of the additive chamber with the appropriate additive, (2) connecting the carrier liquid chamber to a supply means (e.g. a water hose) and (3) appropriately positioning the injector bar for either water or additive flow through the channel.

BRIEF DESCRIPTION OF THE DRAWINGS

These and other objects and advantages of the invention will become apparent upon reading the following detailed description and upon referring to the drawings in which:

FIG. 1 is a perspective view of the applciator device of the present invention; and FIG. 2 is an elevation partial section view of the device of FIG. 1.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings similar features have been given similar reference numerals.

Turning to FIG. 1 there is shown an applicator device 2 having an elongated housing or body 4 and, at the top thereof, secured normal thereto, a handle 6. Extending from the bottom of housing 4, and moveably secured thereto, is an elongated injector bar 8 having a pointed end 10. Bar 8 is preferably hollow and is provided with an appropriate aperture 12 (FIG. 2) near its pointed end 10 and a further aperture 14 positioned appropriately along its length as will be decsribed in more detail hereinafter. A foot plate 16 is secured to injector bar 8, as illustrated, to facilitate the driving of pointed end 10 into the soil by an operator. Within housing 4 are located, in adjacent fashion as illustrated in FIG. 2, a self-contained chamber 18 for the carrier fluid (water, gas or the like) and chamber 20 for an appropriate additive.

Aperture 22 is provided for feeding carrier fluid to chamber 18, and is supplied with a conventional fitting 19 for a water hose. Additive chamber 20 communicates with an additive supply tank 24 having an appropriate capped opening 26 by which additive may be fed to additive supply tank 24. In the illustrated embodiment, additive supply tank 24 includes a clear tube 28 secured adjacent and parallel to housing 4, and provided with appropriate gauge markings 30 so that the volume of additive used may be readily seen by the operator of the device. As well, the device may be provided with a clear tube 31 extending the length of the additive supply tank 24 and communicating therewith to show the level of remaining additive in the device.

As can be seen in FIG. 2, threaded portions 32 of housing 4 separate the carrier fluid chamber 18 and additive chamber 20. As well, O-rings 34 within housing 4, circumscribing injector bar 8 as illustrated, minimize or prevent the escape of fluid from these chambers between the housing 4 and the outside of injector bar 8.

As can be seen in FIG. 2, aperture 14 in injector bar 8 is positioned so that, when injector bar 8 is moved to a first, closed position, aperture 14 is aligned against a portion 36 of housing 4 and no fluid from carrier fluid chamber 18 or additive from additive chamber 20 can pass into injector bar 8. An appropriate mechanical or manual lever 38 as illustrated in phantom, may optionally be provided for moving injector bar 8 to its appropriate positioning relative to housing 4. A lever 38 would be used on the device for example in situations where it would be difficult for the operator's foot to reach plate 16. Appropriate conventional means being provided (not illustrated) ensures that injector bar 8 is seated in one of such positions until the operator wishes to move it to another position.

When injector bar 8 is moved to a second, intermediate, additive supply position (phantom, FIG. 2), aperture 14 is located within additive chamber 20, so that there is free flow of additive from chamber 20 and supply tank 24 through injector bar 8, to the aperture 12 in its point 10 and into the soil. The amount of additive passing through aperture 20 may of course be readily determined by means of gauge markings 30.

In third, open position illustrated in phantom in FIG. 2, injector bar 8 is positioned so that aperture 14 is positioned within carrier fluid chamber 18. Now, carrier fluid, such as water, from carrier fluid chamber 18 passes through aperture 14, injector bar 8 and aperture 12 into the soil.

In operation, when additive chamber 20 has been filled with an appropriate additive, and, for example, a hose 42 has been connected to coupling means 19 of carrier fluid chamber 18, chamber 18 will fill with water but the water will be held in that chamber, assuming the injection bar is in closed position. With additive filling chamber 20, by pushing lever 38 so that injector bar 8 moves to second, additive supply position, with aperture 14 in line with additive chamber 20, additive from that chamber will flow through that aperture into injector bar 8 and be expelled into the soil about pointed end 10 of bar 8. By gauge 30 or time lapse, when appropriate additive has been drawn from chamber 20, lever 38 is then pushed until it is in open position with aperture 14 now aligned within carrier fluid chamber 18. In this position, the supply of additive from chamber 20 to injector bar 8 is terminated. Now water from chamber 18 flows, under pressure, into injector bar 8 through aperture 14, and out of aperture 12, thus expelling the rest of the additive from within injector bar 8 and causing the additive to mix with the water in the soil around pointed end 10.

To shut off the flow of water into the soil, lever 38 is pushed to return injector bar 8 to its original, closed position.

As the carrier fluid in most cases will be water, and the additive may be, for example, a fertilizer, herbicide or pesticide, the fittings of the device should preferably be of non-corrosive materials.

Thus it is apparent that there has been provided in accordance with the invention an applicator device for injecting liquid additives into the soil that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. An applicator device for injecting liquid additives into the soil comprising:
  (a) an elongated housing having a handle means connected at one end thereof;
  (b) an elongated injector bar, one end of which is slidably secured within means at the other end of the housing to permit the bar to move longitudinally with respect to the housing between open and closed positions and an additive feed position, the other end of the bar having means to permit insertion thereof into the soil, the bar being provided with an exit aperture at said other end and an entrance aperture on the bar between its ends, the bar including a channel extending within the bar between the two apertures;
  (c) a carrier liquid chamber in the housing and a carrier liquid supply means in the housing, means communicating the carrier chamber with the carrier supply means said carrier chamber enabling liquid to be passed from the carrier chamber to the channel of the bar;
  (d) an additive chamber in the housing beside the carrier liquid chamber in the longitudinal direction; and
  (e) an additive supply means in the housing, means communicating the additive supply means with the additive chamber, the injector bar being longitudinally moveable with respect to the housing allowing the entrance aperture to be in three different positions such that: (a) when the injector bar is in closed position the entrance aperture is sealed off from both the carrier liquid chamber and the additive chamber so that no carrier fluid or additive can flow through the channel, (b) when the injector bar is in open position the entrance aperture communicates with the carrier liquid chamber enabling liquid in that chamber to communicate with the channel, and (c) when the injector bar is in additive supply position, the entrance aperture communicates with the additive supply chamber enabling additive in that chamber to flow to the channel.

2. A device according to claim 1 wherein the housing is further provided with lever adjustment means connected with the injector bar and manipulable by an operator to permit that operator to move the injector bar to, and hold it in, any desired one of said positions.

3. A device according to claim 1 wherein water is the carrier liquid and said carrier supply means comprises a hose coupling means and a supply aperture for supplying water to the carrier liquid chamber from a hose.

4. A device according to claim 1 the additive chamber further comprising a visible gauge means to enable the operator to determine the amount of additive in the additive chamber and the amount of additive which has passed through the exit aperture in the injector bar during operation of the device.

5. An apparatus according to claim 4 wherein the visible gauge means comprises a tube in fluid communication with the additive chamber so that the level of additive appearing in the tube corresponds to the level of additive in the additive chamber, the tube having gauge marks visible by the operator, the gauge means corresponding to the volume of fluid in the chamber.

6. A device according to claim 1 wherein said other end of the injector bar is pointed to facilitate its passage into the soil.

7. A device according to claim 1 wherein the housing is of tubular shape, said handle means extending normal to the housing at its upper end.

8. A device according to claim 1 wherein a foot plate is secured to the device near its lower end to facilitate injection of the injection bar into the soil.

* * * * *